(No Model.)
H. HARTMAN.
SADDLE ATTACHMENT.
No. 469,565. Patented Feb. 23, 1892.
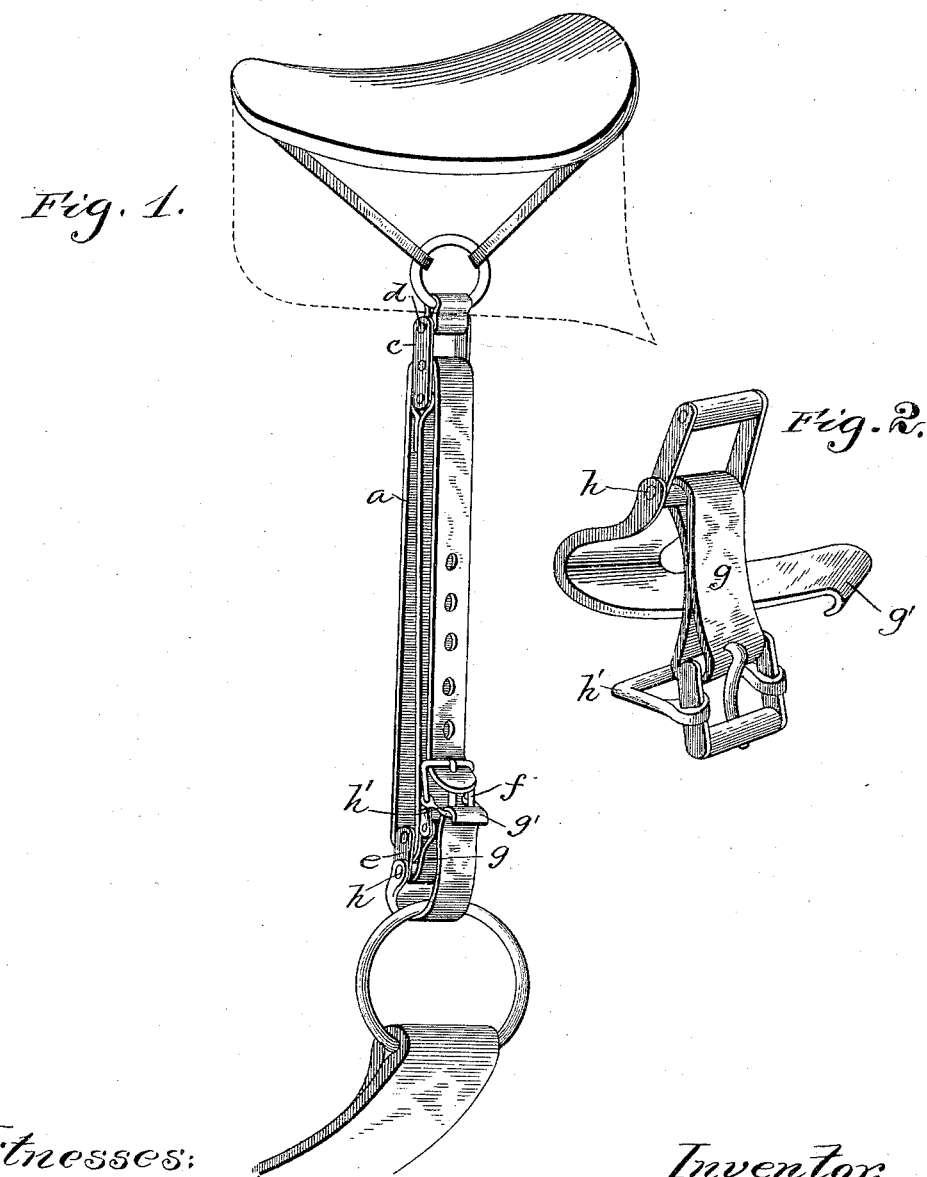
Witnesses:
J. B. McGirr.
[signature]
Inventor:
Henry Hartman
By Ellis Spear
Atty

United States Patent Office.

HENRY HARTMAN, OF OGDEN, UTAH TERRITORY, ASSIGNOR TO A. D. VOIGT, B. TERNES, AND J. W. PETERSON, OF SAME PLACE.

SADDLE ATTACHMENT.

SPECIFICATION forming part of Letters Patent No. 469,565, dated February 23, 1892.

Application filed May 21, 1891. Serial No. 393,518. (No model.)

*To all whom it may concern:*

Be it known that I, HENRY HARTMAN, a citizen of the United States of America, residing at Ogden, in the county of Weber and Territory of Utah, have invented certain new and useful Improvements in Saddle Attachments, of which the following is a specification.

My invention is an improved cincture attachment for riding-saddles; and its object is to provide such a construction that after the cincture has been properly adjusted the saddle may be removed and replaced and secured without manipulating the cincture proper, while at the same time the connection is perfectly secure.

I have shown the invention in connection with a saddle and trappings of ordinary construction; but it will be understood that the attachment can be used in connection with any ordinary or improved style of saddle.

Figure 1 represents the saddle, a portion of the girth, and the intermediate adjusting devices. Fig. 2 is a detail view, on a larger scale, of the connecting device between the cincture and the girth.

In the figures the cincture is shown at $a$, and connects the saddle-ring and girth-ring through the intermediate means hereinafter more fully set forth.

The cincture is connected at its upper end to the saddle-ring through a frame, which is composed of side pieces $c$ and cross-bars $d$, the upper one of which is secured to the saddle-ring through a strap passing around the cross-piece $d$ and a part of the ring, as shown.

The cincture is secured to the lower cross-bar of the frame, passing around the same and fastened in any suitable manner. This leaves spaces between the upper end of the cincture and the saddle-ring on either side of the center bar of the frame, through which the end of the cincture may be passed when desired.

The cincture is in the form of a simple strap; but when in use it is threaded through below the upper cross-bar of my improved attachment, as shown at $e$. The cincture is then passed upwardly and through one of the spaces in the frame and then downwardly, thus carrying the attachment in the loop thus formed.

The free end of the cincture is provided with holes adapted for connection with the buckles $f$, carried by the fastening attachment through the medium of a short strap $g$, connected to the cross-bar $h$.

The attachment serves as a connection between the cincture and the ring of the girth, being made approximately V-shaped, the hook thus formed passing through the girth-ring, as shown in Fig. 1. The upper end of the V-shaped portion has a hook $g'$, which engages with a loop $h'$, extending at right angles from the frame of the buckle. The perforated end of the cincture engages this buckle in the ordinary way and is properly adjusted, the hooked end of the V-shaped portion being first engaged with the loop $h$, as shown in Fig. 1. It will be seen that after the proper adjustment has been secured the animal may be unsaddled and saddled without disturbing the cincture connection by detaching the loop $h'$ from the hook $g'$.

What I claim is—

A detachable connection between the adjustable cincture-strap and the girth, consisting of the V-shaped portion supported in the loop of the cincture-strap, a buckle connected by a short strap to one end of said V-shaped portion, said buckle having a loop extending therefrom, and a hook on the end of the V-shaped portion adapted to engage the loop, substantially as described.

In testimony whereof I affix my signature in presence of two witnesses.

HENRY HARTMAN.

Witnesses:
FRED HALVERSON,
M. JONES.